(No Model.)  3 Sheets—Sheet 2.
J. M. IRWIN.
CORN HARVESTER.
No. 368,890. Patented Aug. 23, 1887.
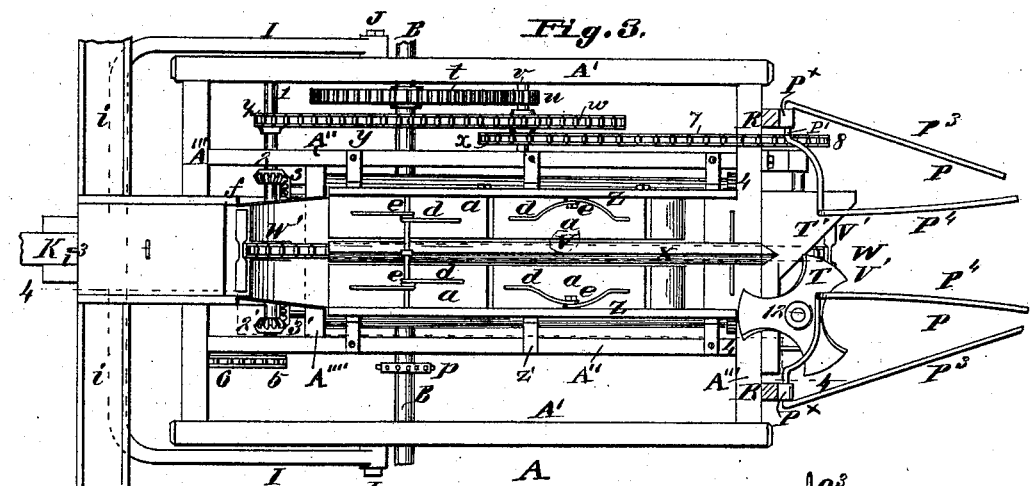
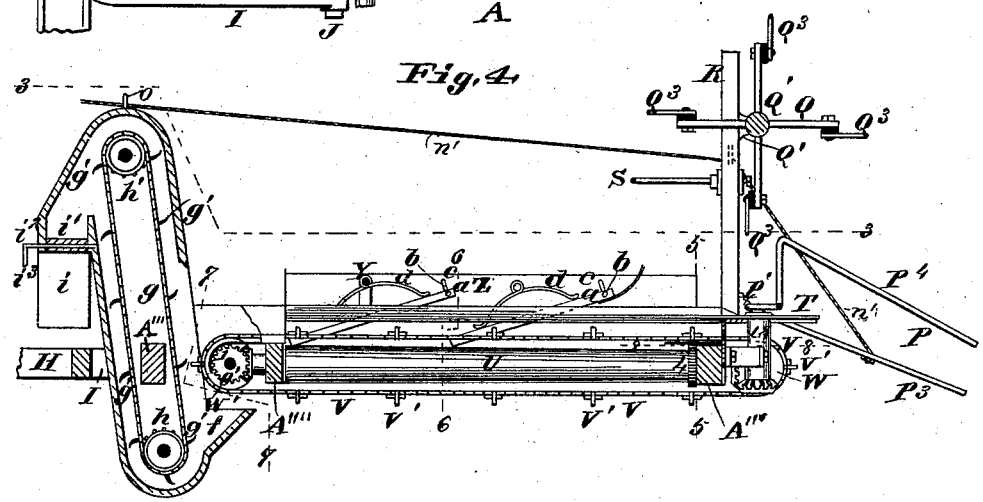
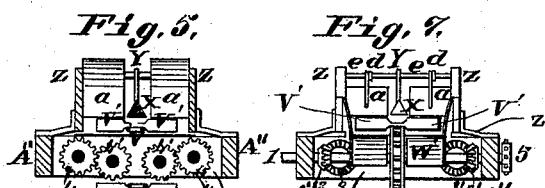
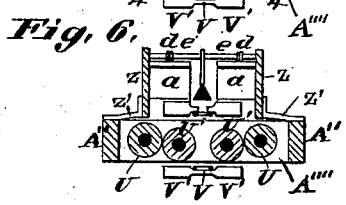
Attest:
Geo. L. Wheelock
Victor A. Lewis
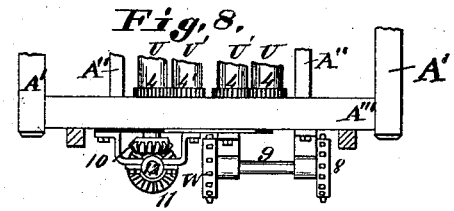
Inventor:
John M. Irwin
By Knight Bros.
Attys.

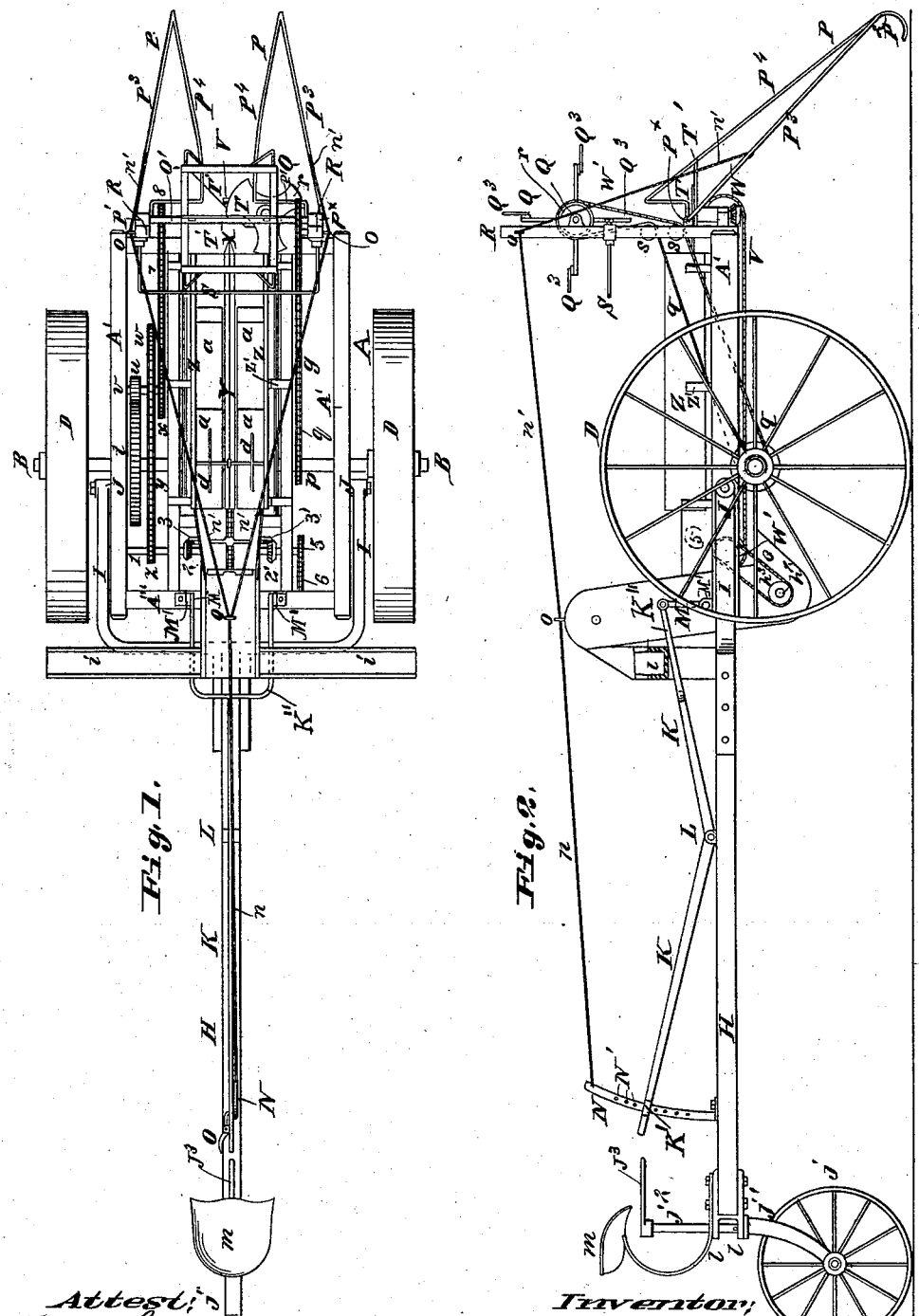

(No Model.) 3 Sheets—Sheet 3.
J. M. IRWIN.
CORN HARVESTER.
No. 368,890. Patented Aug. 23, 1887.
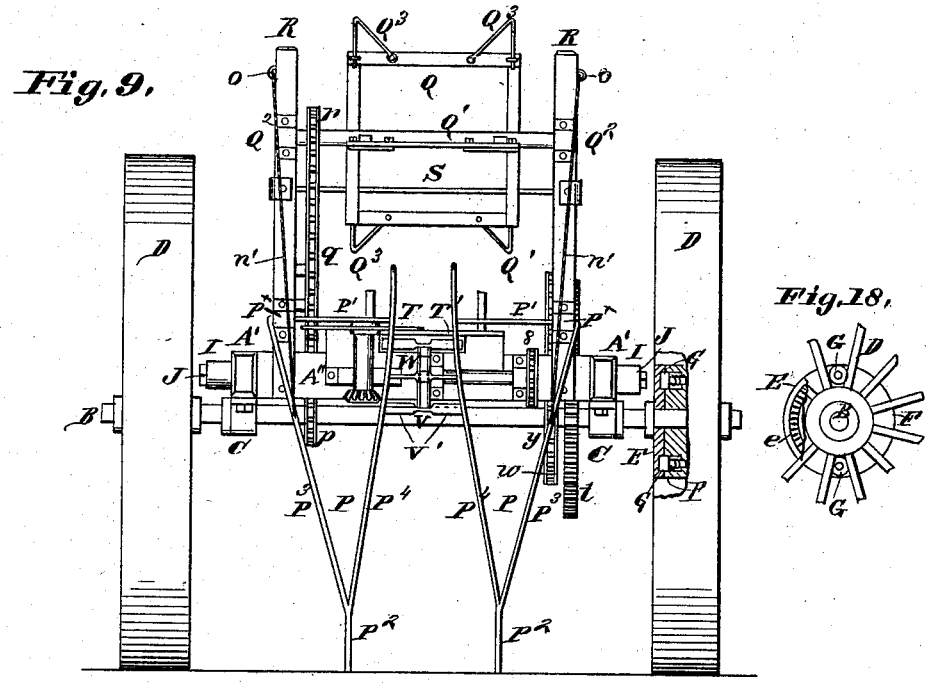
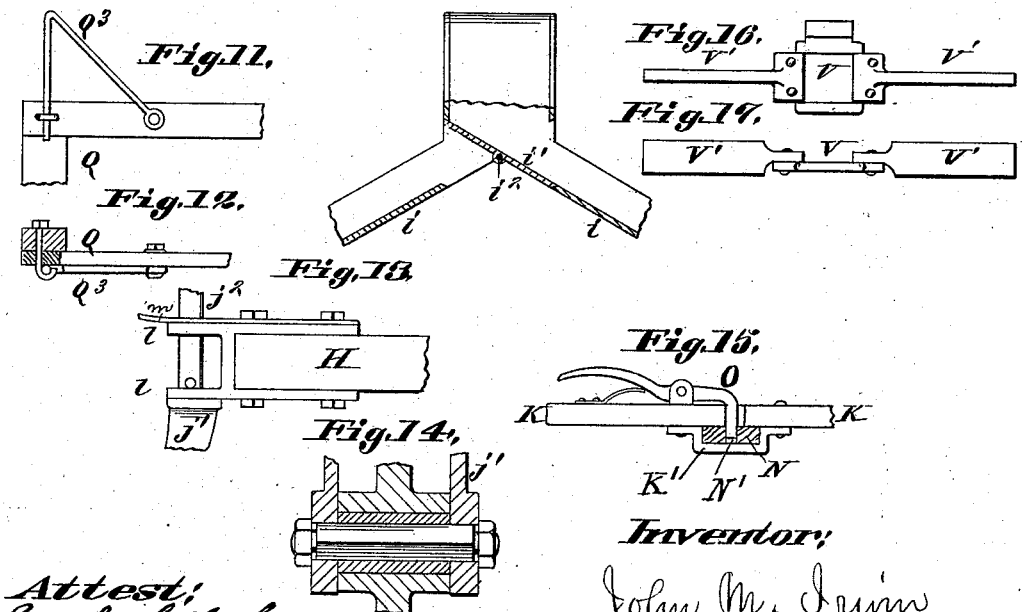
Attest:
Geo. L. Wheelock
Victor A. Lewis
Inventor:
John M. Irwin
By Knight Bros
Attys

UNITED STATES PATENT OFFICE.

JOHN M. IRWIN, OF ST. LOUIS, MISSOURI.

CORN-HARVESTER.

SPECIFICATION forming part of Letters Patent No. 368,890, dated August 23, 1887.

Application filed December 26, 1884. Serial No. 151,187. (No model.)

*To all whom it may concern:*

Be it known that I, JOHN M. IRWIN, of the city of St. Louis, in the State of Missouri, have invented a certain new and useful Improvement in Corn-Harvesters, of which the following is a full, clear, and exact description, reference being had to the accompanying drawings, forming a part of this specification.

This is a machine for gathering the ears of corn with the upper portions of the stalks, the stalks being cut just below the ears, and the parts of the stalks which have been cut off, with the ears attached, being carried lengthwise over rollers, between which the stalks descend, while the ears are carried backward and discharged after having been divested of their husks.

In the drawings, Figure 1 is a top view of my improved machine. Fig. 2 is a side view thereof, one end of a spout being in section. Fig. 3 is a horizontal section on the line 3 3, Fig. 4, the wheels being omitted. Fig. 4 is a longitudinal section thereof on the line 4 4, Fig. 3, looking inward from the side of the machine. Fig. 5 is a detail transverse section on the line 5 5, Fig. 4, looking toward the rear end of the machine. Fig. 6 is a detail transverse section on the line 6 6, Fig. 4, looking toward the rear end of the machine. Fig. 7 is a detail transverse section on the line 7 7, Fig. 4, looking toward the front end of the machine. Fig. 8 is a detail horizontal section on the line 8 8, Fig. 4, looking down. Fig. 9 is an enlarged view of the front end of the machine. Fig. 10 is a detail of part of the elevator and discharge-spouts, the tilting piece by which the ears of corn are directed to either side and the parts of the spout being shown in transverse section. Fig. 11 is a detail elevation of one of the reel-fingers; and Fig. 12 is a top view of same, part in section. Fig. 13 is a detail side view of the rear end of the tongue. Fig. 14 is an axial section of the hub of the steering-wheel and lower ends of the arms of the fork. Fig. 15 is a detail top view of the catch by which the main frame is held at the desired inclination. Figs. 16 and 17 are respectively top and side views of the carrier-arms. Fig. 18 is a detail side view of the ratchet device by which the wheel is made to turn the axle when turning forward.

A is the main frame, supported on an axle, B, by means of journal-boxes C, in which the axle turns. This horizontally-arranged frame consists of the side timbers, A', intermediate longitudinal timbers, A'', transverse end timbers, A''', and short transverse timber A''''.

D are ground-wheels on the ends of the axle, turning loosely backward, but engaging therewith when the wheels are turning forward. The axle is engaged by a ratchet or other suitable connection which will allow the wheel to turn freely backward on the axle. A suitable ratchet device is shown in Figs. 9 and 18, the rim of the wheel being broken out in Fig. 9 to show the device.

E is a ratchet-wheel secured fast to the axle, and F is a disk secured to the wheel, on which the spring pawls or dogs G have bearing, said pawls engaging the ratchet-teeth $e$ when the wheel is turning forward and slipping over said teeth when the wheel is turning backward on the axle.

The animals by which the machine is pushed forward are hitched to the rear end of a tongue, H, extending rearward from the frame A and connected to the frame by hounds I, which are pivoted to the sides of the frame at points J, that are near to the axle B, so that the tilting of the frame but slightly changes the elevation of the hounds. The hounds I may be pivoted upon the axle B.

The frame A is tilted on the axle to accommodate its fore end to the height of the ears of corn upon the stalks. This adjustment of the frame A is accomplished by the following mechanism:

K is an angular or bent lever fulcrumed at its bent portion to the top of the tongue by lugs or ears L and connected at its forked fore end, K'', to the back end of the frame A by a link or links, M, and ears M'. The rear end of the lever works on a standard, N, being held thereto by a strap, K', (see Figs. 2 and 15,) and has a spring-catch, O, whose bolt enters one of a number of holes, N', of the standard to hold the lever and consequently the frame A in any desired position. By this means it will be seen that the position of the frame can be readily changed while the machine is in motion. It is well known that in many corn-fields the height of the ears from the ground varies considerably in different parts of the field, requiring an adjustment of the frame A.

P are guide-frames, which run in advance and serve to guide the cornstalks to the mouth of the machine, and also tend to keep the machine straight with the row of corn. The guide-frames are shown constructed of bar iron or steel. They are hinged to the brackets P$^x$ at the front of the machine on the standards R by the horizontal portions P', the hinge-connection being such that the front end of the guides have free vertical movement and are sustained by contact with the ground, having rearward-curved runners P$^2$ passing along the surface. The outer bars, P$^3$, extend straight from the hinges to the runners, while the inner bars, P$^4$, extend from the front at points above the runner upward, downward, outward, and rearward to the horizontal portion, the bars P$^4$ extending from the runner to the mouth of the machine, and by them the stalks are guided to the mouth of the machine, as aforesaid.

Q is a revolving reel, whose shaft Q' has bearing in boxes Q$^2$ adjustably attached to standards R fixed to the frame A. The reel carries the upper ends of the stalks backward and they pass into, between the arms of, and against the rear portion of a vertically-adjustable bail, S, by which they are temporarily sustained in upright position at the same time the stalks are severed by the cutting device below the ears. The cutting device consists of a rotary cutter having cutting-blades T and a fixed blade, T', upon which the butts of the stalks are sustained after the cutting. The arms of the rotating reel have at their ends guide-frames Q$^3$, to guide the tops of the stalks inward.

As the stalks are cut off, those standing on the fixed blade T' are forced backward upon the horizontally-arranged rollers U, which are journaled in the front transverse end timber, A''', and in the short transverse timber A'''', and are placed in two pairs and so geared that the sides of the rollers in each pair, which in contact with (or close proximity to) each other shall move or turn downward, so as to draw the stalks and husks downward and drop them upon the ground beneath the machine. At the same time the ears of corn, owing to their size, ride upon the rollers and are carried rearward by the laterally-arranged wings V' of the endless conveyer V. The conveyer-chain is upon a sprocket-wheel, W, at the fore end, and may run upon an idle-roller, W', at the rear end; or it may be driven by the wheel W', if preferred, or both wheels may be drivers. Over the space between the two pairs of rollers U U' is a bar, X, and above this a partition, Y, forming the inner wall of the two channels, of which the stripping-rollers U U' form the bottoms. The outer walls of these channels are shown at Z, supported over the center of the upper outer rollers by means of brackets Z', bolted thereto and to the side timbers of the frame. Thus a compact single channel is provided for the horizontal wings to work in, the wings being arranged perpendicularly to the belt or carrier working over the rollers. It will be understood that along these channels the corn passes. The corn is pressed down upon the rollers U by boards $a$, having studs $b$ at their edges, near the front ends, which occupy slots $c$, made in the walls Y and Z. The construction allows the pressure-boards a limited vertical movement at the fore end and free vertical movement at the rear end, so that they accommodate themselves to the amount of material passing beneath them.

$d$ are half-elliptical springs, which are pivoted to the walls Y and Z at $e$, and whose ends bear upon the pressure-boards near their ends. The ears of corn, after the stalks and most or all of the husks have been drawn down between the rollers U, are discharged by the conveyer into a receiver, $f$, in which works an endless elevator, $g$, running on sprocket-wheels $h$ and $h'$, and having buckets $g'$, which carry up the ears of corn and discharge them into a spout, $i$, sloping toward both sides.

$i'$ is a tilting valve, by which the ears of corn are deflected to either of the trough-chutes. (See Fig. 10.) This valve is turned upon its axis $i^2$ by a lever, $i^3$. It is intended that the corn-ears shall be discharged from the chute into a wagon-box.

The rear end of the tongue is supported on a caster wheel or wheels, $j$, supported on a yoke, $j'$, upon a spindle, $j^2$, working in bearings $l$ and having a tiller, $j^3$, by which the spindle is turned to guide the machine. The driver's seat is shown at $m$.

$n$ is a cord, one end of which is secured in proximity to the driver and which has branches $n'$, leading to the guide-frames P. The cord and branches thereof pass through guide-eyes $o$, and the arrangement is such that the guide-frames may be lifted from the ground by drawing the said cord backward.

The axle B carries a sprocket-wheel, $p$, connected by a drive-chain, $q$, with a sprocket-wheel, $r$, upon the reel-shaft Q. The drive-chain is shown passing under two idle-wheels, $s$, upon the standard R.

$t$ is a spur-wheel, which may be fast to the axle B or may turn loose thereon and be connected thereto by a clutch. In the latter case all of the machinery except the reel can remain at rest when moving the machine from place to place. In the same manner the sprocket-wheel $p$ may turn loose on the axle and have clutch-connection for a like purpose. The spur-wheel $t$ engages a pinion, $u$, upon a counter-shaft, $v$, upon which are two sprocket-wheels, $w$ and $x$. The sprocket-wheel $w$ is connected by a drive-chain, $y$, with a sprocket-wheel, $z$, upon a shaft, 1. The shaft 1 carries two bevel-wheels, 2 and 2', which engage bevel-wheels 3 and 3' upon the shafts of the two rollers U, one roller in each pair U U'. The shaft of each roller U at the opposite end of the bevel-wheel carries a spur-wheel, 4, which engages a similar wheel, 4', on the shaft of each roller U', so that the two rollers of each pair turn together and in opposite directions, as required. The outer roller, U, of each pair is placed at a somewhat higher elevation than the other roller, U', so that the stalks and husks as they pass downward between the rolls will be thrown outward sufficiently to miss the endless carrier, because the upper outer rollers bear on the lower inner rollers at points higher than the horizontal plane in which the lower rollers rotate, thus causing the stalks and husks to pass off at a tangent to the lower rollers.

I would say that I prefer to make the rollers U U' somewhat tapering, the fore ends being of less diameter than the rear ends, so that the stalks may pass with more readiness between the rollers at their fore ends, while at the rear parts the rollers shall take a firmer hold of the husks and tear them from the ears.

The sprocket-wheel W', carrying the rear end of the conveyer V, turns loosely on the shaft 1. The shaft 1 carries a sprocket-wheel, 5, connected by a drive-chain, 6, with the sprocket-wheel $h^3$ upon the lower shaft, $h^2$, of the elevator $g$, said shaft carrying the sprocket-wheel $h$, by which the endless elevator-chain is driven.

The sprocket-wheel $x$ upon the countershaft $v$ is connected by a drive-chain, 7, with a sprocket-wheel, 8, upon a shaft, 9, which carries the sprocket-wheel W, by which the fore end of the conveyer V is carried and by which it is driven.

The shaft of one of the rollers U carries a bevel-wheel, 10, which engages a bevel-wheel, 11, upon the lower part of the shaft 12, which carries the rotary cutter T.

In the operation of the machine it will be understood that if any cornstalks are leaning to either side the guides P will erect them and present them in proper position to the cutter, and the guides will give side support to the stalks until the reel engages their tops. The covers $a$ act to keep the ears in a horizontal position upon the rollers U U' and to insure that they shall be parallel with the rollers, so that they will travel backwardly in the groove between the rollers, and the rollers will engage the shucks and tear them from the ears.

I claim as new and of my invention—

1. The combination of the frame having the side timbers, the intermediate longitudinal timbers, A'', the front transverse end timber A''', the short transverse timber A'''', the pairs of horizontal rollers supported by the transverse timbers, the side walls, Z, supported by the brackets Z', central bar, X, partition Y over the bar, and an endless carrier having wings working between the pairs of rollers and the central bar, substantially as described.

2. The combination of a frame, a cutter for severing the stalks beneath the ears, combined stalk-stripping, ear-husking, and ear-supporting lower and inner and outer and upper rollers, and a conveyer for moving the ears endwise on the rollers, substantially as described.

3. The combination of a frame having standards thereon, the guide frames P, hinged to the standards, each frame being formed with a runner, $P^2$, a horizontal portion, P', outer side bar, $P^3$, extending from the standard to the runner, the inner bar, $P^4$, extending from the front at a point above the runner upward and rearward, then downward, outward, and rearward to the horizontal portion, and means for raising and lowering the guide-frames, substantially as described.

4. The combination of a frame, a moving cutter, a fixed blade on which the severed portions of the stalks are sustained, a bail in which the severed portions are held in upright position, a reel pressing the severed portions into the bail, and rollers between which the severed portions are dropped endwise while held in the bail, substantially as described.

5. The combination of a frame having standards, a fixed blade, a cutter, a reel journaled to the standards over the blade and adjustable vertically, and a bail secured to the standards and adjustable thereon, substantially as described.

6. The combination of a horizontally-arranged frame, a moving cutter, a fixed blade upon which the severed stalks stand, an adjustable bail into which the severed portions are pressed and by which they are held upright, and rollers beneath the bail for stripping the stalks and husks from the ears as they are drawn lengthwise through them, substantially as described.

7. The combination of a frame having combined stalk-stripping ear-husking rollers and spring-pressure boards extending lengthwise of the frame for holding the ears down on the rollers, endless carrier, and driving mechanism for moving the several ears along the rollers, substantially as described.

8. The combination of a horizontally-arranged frame, rollers for stripping the stalks and husks from the ears and supporting the latter, the walls Z, central partition, Y, and boards $a$, hinged to the walls and partition, substantially as described.

JOHN M. IRWIN.

Witnesses:
SAML. KNIGHT,
GEO. H. KNIGHT.